United States Patent
Rivera

(10) Patent No.: US 8,651,884 B1
(45) Date of Patent: Feb. 18, 2014

(54) EJECTABLE MEMORY CARD TRAY IN A UNIVERSAL SERIAL BUS (USB) CONNECTOR

(75) Inventor: Felix Jose Alvarez Rivera, San Jose, CA (US)

(73) Assignee: Google Inc., Mountain View, CA (US)

( * ) Notice: Subject to any disclaimer, the term of this patent is extended or adjusted under 35 U.S.C. 154(b) by 22 days.

(21) Appl. No.: 13/443,422

(22) Filed: Apr. 10, 2012

(51) Int. Cl.
  *H01R 13/62* (2006.01)
(52) U.S. Cl.
  USPC .......................................... 439/159
(58) Field of Classification Search
  USPC .................... 439/157–160, 638–640
  See application file for complete search history.

(56) References Cited

U.S. PATENT DOCUMENTS

| | | | |
|---|---|---|---|
| 6,053,748 A | 4/2000 | Bricaud et al. | |
| 6,149,466 A | 11/2000 | Bricaud et al. | |
| 6,382,995 B1 | 5/2002 | Bricaud et al. | |
| 6,544,074 B2 | 4/2003 | Bricaud et al. | |
| 6,568,960 B2 | 5/2003 | Bricaud et al. | |
| 6,609,936 B2 | 8/2003 | Bricaud et al. | |
| 6,984,140 B2 | 1/2006 | Juret et al. | |
| 6,988,659 B2 * | 1/2006 | Fukuda ........................ | 235/441 |
| 7,033,221 B2 | 4/2006 | Bricaud et al. | |
| 7,048,589 B2 | 5/2006 | Bricaud et al. | |
| 7,066,748 B2 | 6/2006 | Bricaud et al. | |
| 7,257,747 B2 * | 8/2007 | Song ............................. | 714/718 |
| 7,307,849 B2 * | 12/2007 | Ho et al. ....................... | 361/737 |
| 7,766,678 B1 | 8/2010 | Abe | |
| 7,824,186 B2 | 11/2010 | Zhao et al. | |
| 7,828,599 B2 | 11/2010 | Zhao et al. | |
| 7,833,056 B1 | 11/2010 | Lee et al. | |
| 7,837,499 B1 | 11/2010 | Chen | |
| 7,853,725 B2 | 12/2010 | Desai et al. | |
| 7,862,377 B2 | 1/2011 | Shiu et al. | |
| 7,922,525 B2 | 4/2011 | Lee | |
| 7,927,145 B1 | 4/2011 | Chang | |
| 8,013,616 B2 | 9/2011 | Crumlin et al. | |
| 8,202,103 B2 * | 6/2012 | Zhou et al. .................... | 439/159 |
| 8,215,991 B2 * | 7/2012 | Bryant-Rich ............ | 439/607.22 |
| 8,359,418 B2 * | 1/2013 | Bryant-Rich ................. | 710/301 |
| 8,460,020 B2 * | 6/2013 | Hsiao ............................ | 439/159 |

\* cited by examiner

*Primary Examiner* — Chandrika Prasad
(74) *Attorney, Agent, or Firm* — Brake Hughes Bellermann LLP

(57) ABSTRACT

According to one general aspect, an apparatus includes a connector receptacle coupled to an electronic device. The connector receptacle is configured to receive a universal serial bus (USB) connector and a Micro SIM card. A connection member is disposed within the connector receptacle and configured to provide electrical communication between the Micro SIM card and the electronic device when the Micro SIM card is coupled to the connector receptacle. In some implementations, the electrical connector can also provide electrical communication between a USB connector and the electronic device when the USB connector is coupled thereto.

21 Claims, 6 Drawing Sheets

US 8,651,884 B1

EJECTABLE MEMORY CARD TRAY IN A UNIVERSAL SERIAL BUS (USB) CONNECTOR

TECHNICAL FIELD

This description relates to a universal serial bus connector receptacle for use within an electronic computing device.

BACKGROUND

Some computing devices, such as, for example, laptop computers, desktop or personal computers (PCs), tablets, cell phones, etc., include one or more universal serial bus (USB) connector ports or receptacles that can be used to couple other peripheral electronic devices thereto. Some computing devices include a port or receptacle that can receive a memory device, such as a smart card, a Micro Subscriber Identity Module (SIM) card, etc., and the design of the computing device typically has certain space requirements to accommodate such ports or receptacles. But the space requirements for such receptacles increase the footprint of the electronic device and may adversely affect the industrial design of the device.

SUMMARY

According to one general aspect, an apparatus includes a connector receptacle coupled to an electronic device. The connector receptacle is configured to receive a universal serial bus (USB) connector for an external device. The connector receptacle is further configured to receive a memory card, such as a Micro Subscriber Identity Module (SIM). A connection member is disposed within the connector receptacle and configured to provide electrical communication between the memory card and the electronic device when the memory card is received by the connector receptacle. In some implementations, the electrical connector can also provide electrical communication between the USB connector and the electronic device when the connector receptacle receives the USB connector.

According to another general aspect, an apparatus includes a universal serial bus (USB) connector receptacle coupled to an electronic device. The USB connector receptacle includes an ejectable tray configured to receive a removable memory device thereon. The ejectable tray is configured to be moved between a first position in which the ejectable tray is disposed within an interior region of the USB connector receptacle and a second position in which the ejectable tray is disposed at least partially outside of the interior region of the USB connector receptacle and at least partially outside of the electronic device.

According to another general aspect, a connector receptacle for an electronic device includes an ejectable tray configured to receive a memory device thereon. The ejectable tray is configured to be moved between a first position in which the ejectable tray is disposed within an interior region of the connector receptacle and a second position in which the ejectable tray is disposed at least partially outside of the interior region of the connector receptacle and at least partially outside of the electronic device such that the memory device can be disposed thereon. Electrical circuitry is disposed within the connector receptacle and configured to provide electrical communication between the memory device and the electronic device when the memory device is disposed on the ejectable tray and the ejectable tray is in its first position. The electrical circuitry is also configured to provide electrical communication between a USB connector and the electronic device when the USB connector is coupled to the connector receptacle.

The details of one or more implementations are set forth in the accompanying drawings and the description below. Other features will be apparent from the description and drawings, and from the claims.

DETAILED DESCRIPTION

Disclosed embodiments include a connector port or receptacle usable within an electronic device that can receive a USB connector and also can receive a removable memory device, such as a Micro SIM card, within the same connector port or receptacle. Such a connector port or receptacle with multiple functions can reduce the space that may be required for separate connector ports or receptacles within the electronic device, thereby reducing the footprint of the electronic device and improving the aesthetic design options for the electronic device while preserving the functionality of the electronic device.

Accordingly, a connector receptacle (e.g., a multi-functional connector receptacle) for an electronic device that can receive and operatively couple to the electronic device both a universal serial bus (USB) connector and a memory device (e.g., a memory card) such as a Micro SIM card, a Secure Digital (SD) card, a Micro MultiMedia Card (MMC), a Micro M2 memory stick, etc., is described herein. For example, a Micro SIM card can be strategically hidden within the connector receptacle and a user can access the Micro SIM card via an ejectable Micro SIM tray incorporated within (e.g., integrated within) the connector receptacle. Some implementations of the connector receptacle allow a user easy access to remove and change the Micro SIM card, while reducing the space required for ports and receptacles to accommodate both a USB connector and a Micro SIM card. Some implementations can incorporate the connection electronics that allow the Micro SIM card to communicate with a processor of the computing device in which the connector receptacle is placed. In some implementations, the connector receptacle also provides cellular network connectivity.

Figure 1:
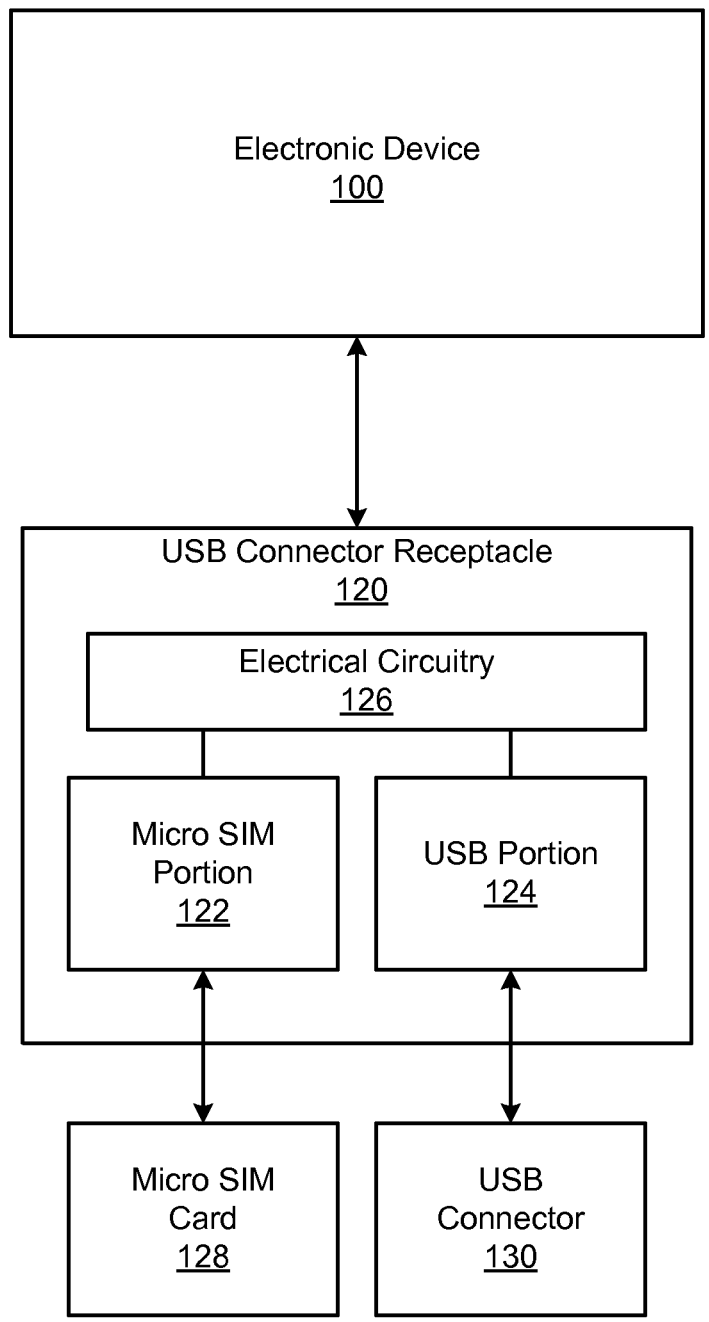
FIG. 1 is a schematic block diagram of a computing device and a connector receptacle, according to an implementation.

FIG. 1 is a block diagram of a connector receptacle 120 (also referred to as a "connector port") that can be coupled to (e.g., disposed within) an electronic device 100. The electronic device 100 can be, for example, a computing entity (e.g., a personal computing device, such as, a laptop computer, a desktop computer, a netbook computer, a tablet, a touchpad, etc.), a server device (e.g., a web server), a mobile phone, a personal digital assistant (PDA), a television with at least one or more processors, an e-reader, etc. The electronic device 100 can be, for example, a wired device and/or a wireless device (e.g., wi-fi enabled device). The electronic device 100 can be configured to operate based on one or more platforms (e.g., one or more similar or different platforms) that can include one or more types of hardware, software, firmware, operating systems, runtime libraries, etc.

The electronic device 100 can include one or more processors (not shown in FIG. 1), and one or more memories (not shown in FIG. 1). In some implementations, the electronic device 100 can represent a cluster of devices. In such an implementation, the functionality and processing of the electronic device 100 (e.g., one or more processors the electronic device 100) can be distributed to several electronic devices of the cluster of electronic devices.

In some implementations, one or more portions of the components of the electronic device 100 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). The components of the electronic device 100 can be configured to operate within an environment that includes an operating system.

In some implementations, the electronic device 100 can be included in a network. In some implementations, the network can include multiple electronic devices and/or multiple server devices (not shown). Also, although not shown in FIG. 1, the electronic device 100 can be configured to function within various types of network environments. For example, the network can be, or can include, a local area network (LAN), a wide area network (WAN), etc. using, for example, gateway devices, bridges, switches, and/or so forth. The network can include one or more segments and/or can be have portions based on various protocols such as Internet Protocol (IP) and/or a proprietary protocol. The network can include at least a portion of the Internet.

The connector receptacle 120 may include a housing or shell (not shown in FIG. 1) that can be coupled to the electronic device 100. The connector receptacle 120 includes a Micro SIM portion 122, a universal serial bus (USB) portion 124, and an electrical circuitry 126. Although shown in FIG. 1 as a Micro SIM portion, those of ordinary skill in the art will understand that portion 122 represents, and may be configured for, other types of similarly sized or smaller memory devices, such as Micro SD, Micro M2, MMC Micro, etc. The Micro SIM portion 122 can receive therein a Micro SIM card 128 and operatively couple the Micro SIM card 128 to the electronic device 100. The USB portion 124 can receive a USB connector 130 and operatively couple the USB connector 130 to the electronic device 100.

Figure 2:
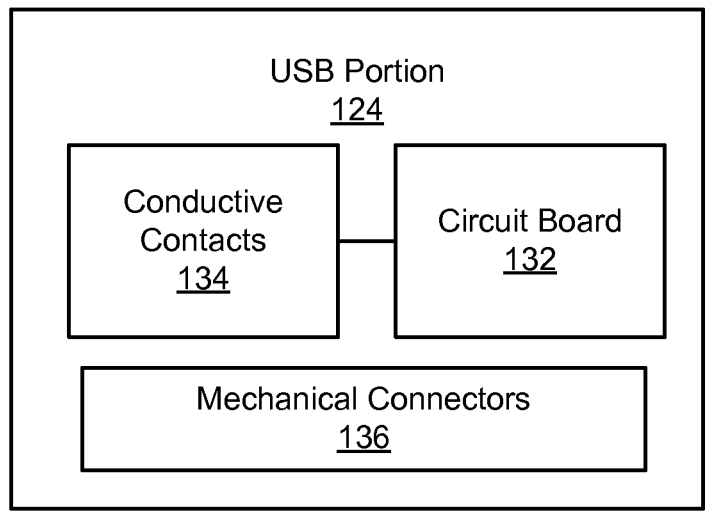
FIG. 2 is a schematic block diagram of a USB connection portion, according to an implementation.

As shown in FIG. 2, the USB portion 124 (which was introduced in FIG. 1) can include a circuit board 132, one or more electrically conductive contacts 134 and one or more mechanical connectors 136. When a USB connector 130 is coupled with the connector receptacle 120, the electrically conductive contacts 134 can be coupled to (e.g., can connect with, can be contacted with) corresponding contacts on the USB connector 130, allowing data communications between a peripheral electronic device connected by the USB connector 130 and the circuit board 132. In some implementations, circuit board 132 may be incorporated into electrical circuitry 126. In other implementations, circuit board 132 may be separate from or coupled to electrical circuitry 126. Mechanical connectors 136 of USB portion 124 may be removably coupled with (i.e., coupled with but removable from) openings or depressions in USB connector 130, ensuring a more secure connection between conductive contacts 134 and the corresponding contacts on the USB connector 130.

Figure 3:
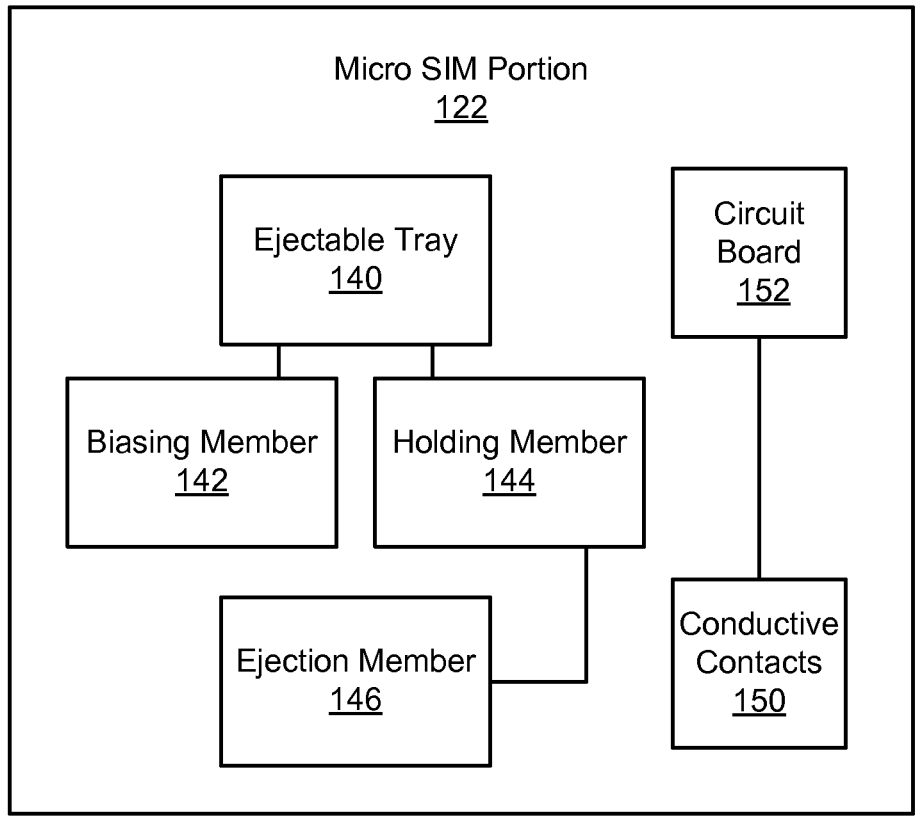
FIG. 3 is a schematic block diagram of a Micro SIM connection portion, according to an implementation.

As shown in FIG. 3, the Micro SIM portion 122 (which was introduced in FIG. 1) can include an ejectable tray 140, a biasing member 142, a holding member 144, an ejection member 146, conductive contacts 150, and circuit board 152. The ejectable tray 140 is movably disposed within an interior region defined by the housing (not shown) of the connector receptacle 120. The ejectable tray 140 can receive thereon a Micro SIM card 128. The ejectable tray 140 is configured to be moved between a first, or latched, position in which the ejectable tray 140 is disposed within the interior region of the connector receptacle 120, and a second, or unlatched, position in which the ejectable tray 140 is disposed at least partially outside of the interior region of the connector receptacle 120 and at least partially outside of the electronic device 100 through an opening of the connector receptacle 120, such as an opening configured to receive the USB connector. In the unlatched position a Micro SIM card 128 can be removed from or placed on the ejectable tray 140.

The biasing member 142 can be configured to bias the ejectable tray 140 into the second (i.e., unlatched) position. For example, the biasing member 142 can be a spring member configured to push or bias the ejectable tray 140 at least partially out of the interior region of the connector receptacle 120. The holding member 144 can be used to hold or maintain the ejectable tray 140 in the first (i.e., latched) position. For example, the holding member 144 can have a first configuration in which a portion of the holding member 144 contacts and maintains the ejectable tray 140 in the first position and a second configuration in with the portion of the holding member 144 loses contact with (e.g., is no longer in contact with, is separate from) the ejectable tray 140. For example, the holding member 144 may lose contact after moving or being moved a non-zero distance from the ejectable tray 140. Thus, when the holding member 144 is in the first configuration, the holding member 144 acts on or applies a force against the force of the biasing member 142. When the holding member 144 is in the second configuration, the ejectable tray 140 can be moved by the biasing member 142 to the second position. In some implementations, the holding member 144 can be, for example, a spring member.

In some implementations, the holding member 146 can include a protrusion configured to be received within a recess (e.g., cut-out portion) in the ejectable tray 140 such that when the protrusion is disposed within the recess of the ejectable tray 140, the biasing member 142 is unable to move ejectable tray 140 to the second position. In other words, the ejectable tray 140 can be fixedly coupled so that the biasing member 142, even though applying a force against the ejectable tray 140, may not move (may not substantially move) the ejectable tray 140 to the second position. When the protrusion is moved out of the recess (e.g., cut-out portion) of the ejectable tray 140, the ejectable tray 140 is released (e.g., becomes free to move) to the first position by (e.g., in response to) the biasing member 142.

The ejection member 146 may be operatively coupled to the connector receptacle 120 and configured to move the holding member 144 from the first configuration to the second configuration through actuation by a user. For example, the ejection member 146 can be accessible to the user through an opening in the connector receptacle 120, such as the USB portion 124. In one example, to move the ejectable tray 140 to the unlatched position (e.g., such that the biasing member 142 moves tray 140 at least partially outside of the connector receptacle 120 so that a Micro SIM card 128 can be placed thereon), the user can insert a pin or other implement configured to move (or cause to move) the ejection member 146, which in turn can move the holding member 144 to the second configuration and allow the ejectable tray 140 to be moved to the unlatched position. With the ejectable tray 140 in the unlatched position, the user can place a Micro SIM card 128 on the ejectable tray 140. The ejectable tray 140 can then be pushed inward into the interior region of the connector receptacle 120 such that the Micro SIM card 128 is forced into the first (i.e., latched) position.

When the ejectable tray 140 has been moved to the latched position within the connector receptacle 120 with the Micro SIM card 128 disposed thereon, the Micro SIM card 128 may contact one or more conductive contacts 150. Conductive contacts 150 may allow the Micro SIM card 128 to be electrically coupled to (e.g., in communication with) the circuit board 152. Conductive contacts 150 may be made of any electrically conductive material and may operably connect Micro SIM card 128 with circuit board 152. In some implementations the circuit board 152 may be incorporated into electrical circuitry 126. In other implementations the circuit board 152 may be separate from or coupled to electrical circuitry 126. Circuit board 152 and/or electrical circuitry 126 may provide electrical communication between the Micro SIM card 128 and the electronic device 100. The electrical circuitry 126 can also provide electrical communication between a USB connector 130 operably coupled to the USB connection 124 and the electronic device 100. Thus, the electronic device 100 can include a single connector receptacle 120 that can be used to receive and electrically connect both a USB connector 130 and a memory device, such as a Micro SIM card 128.

Figure 4:
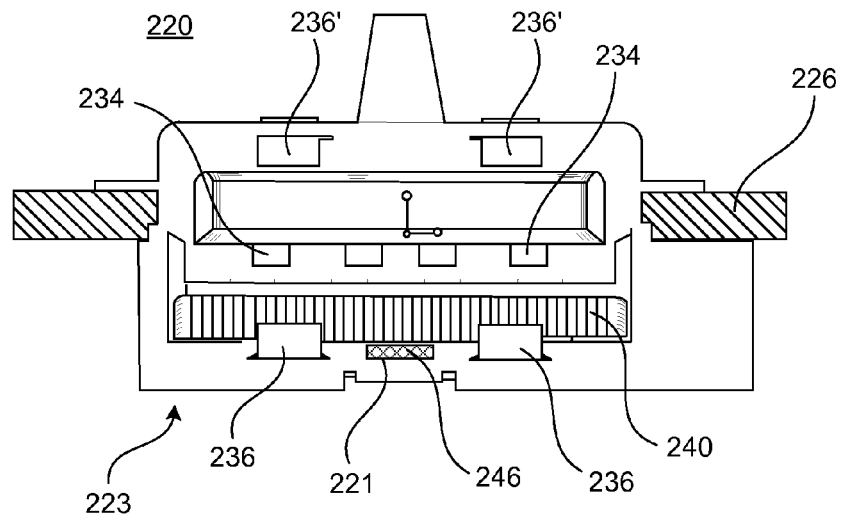
FIG. 4 is a front view of a connector receptacle, according to an implementation, and shown with a Micro SIM card disposed therein.

FIGS. 4-7 illustrate an example implementation of a connector receptacle, according to an implementation. A connector receptacle 220 can be coupled to an electronic device (not shown) as described above for connector receptacle 120. FIG. 4 is a front view of a connector receptacle 220. Connector receptacle 220 may include an electrical circuit board 226. Electrical circuit board 226 may include circuitry for connecting (e.g., facilitating communication between) a USB connector to the electronic device, for connecting (e.g., facilitating communication between) a memory device, such as a Micro SIM card, to the electronic device, or both. Electrical circuit board 226 may be operably connected to conductive contacts 234. Conductive contacts 234 may be fashioned of any electrical conductive material. In some implementations, conductive contacts 234 may be gold contacts, aluminum contacts, and so forth. Conductive contacts 234 may connect with corresponding conductive contacts on the USB connector 130, allowing data communications between a peripheral electronic device connected to the USB connector 130 and the circuit board 226 and, thus, to a processor of the electronic device. The connector receptacle 220 can include mechanical connectors 236 and 236' that can be removably coupled with corresponding openings or depressions on a USB connector (not shown), ensuring a more secure connection between conductive contacts 234 and the corresponding conductive contacts in the USB connector.

Connector receptacle 220 may include an opening 221 that gives a user access to a ejection member 246. In some implementations, a user may access ejection member 246 through the opening 221. For example, a user may access ejection member 246 using a pin, a needle, or some other instrument of sufficient size to fit through the opening 221 and contact ejection member 246. In some implementations a portion of ejection member 246 may protrude partially or fully through the opening 221. In such embodiments the protrusion should not interfere with the coupling of a USB connector with connector receptacle 220.

Connector receptacle 220 may also include ejectable tray 240. Ejectable tray 240 may be designed to be removably disposed (e.g., placed, fit, removably coupled but removable) into the interior of connector receptacle 220 and to receive (e.g., hold) a memory device, such as Micro SIM card 228. The dimensions of ejectable tray 240 may be defined by the dimensions of a housing of receptacle 220 and the dimensions of the memory device. Ejectable tray 240 may have a first (latched) position and a second (unlatched) position. In the first position, ejectable tray 240 may be disposed within the interior region of connector receptacle 220. In the second position, ejectable tray 240 may be disposed at least partially outside of the interior region of connector receptacle 220. In the second position, the ejectable tray 240 can be configured so that a user may remove or insert a memory device, such as a Micro SIM card, into ejectable tray 240.

Figure 5:
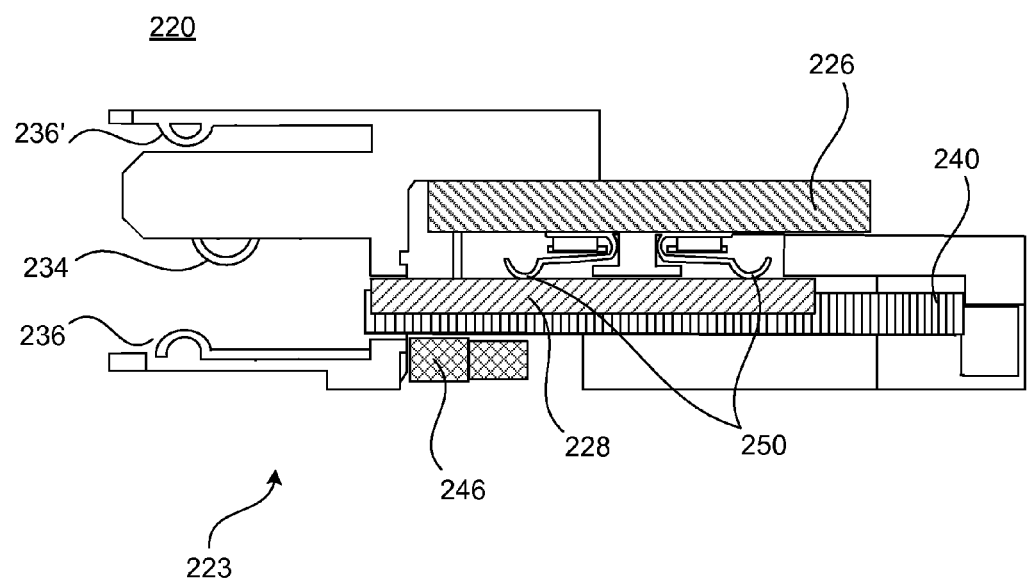
FIG. 5 is a side cross-sectional view of the connector receptacle of FIG. 4.

FIG. 5 is a side cross-sectional view of connector receptacle 220 illustrating an example first position of an ejectable tray 240 and Micro SIM card 228 within connector receptacle 220. As shown in FIG. 5, in some implementations, the ejectable tray 240 is disposed in a space (e.g., region) between electrical circuit board 226 and a bottom portion 223 of connector receptacle 220. A memory device, such as Micro SIM 228 may be disposed within (e.g., fit into) ejectable tray 240. As discussed above, ejectable tray 240 may have a first, or latched, position and a second, or unlatched, position. FIG. 5 illustrates an example of an ejectable tray 240 in the latched position. In the latched position, the memory device, such as Micro SIM 228, may contact conductive contacts 250. Conductive contacts 250 may comprise any conductive material that allows electrical signals to flow between, for example, Micro SIM 228 and electrical circuit board 226. In some implementations, conductive contacts 250 may be gold contacts. Such electrical signals may allow Micro SIM 228 to communicate with a processor (not shown) of the electrical device. For example, when ejectable tray 240 is in the latched position the processor may access and retrieve data stored in Micro SIM 228. In implementations, the processor may be able to store data (e.g., phonebook data) on Micro SIM 228.

Figure 6:
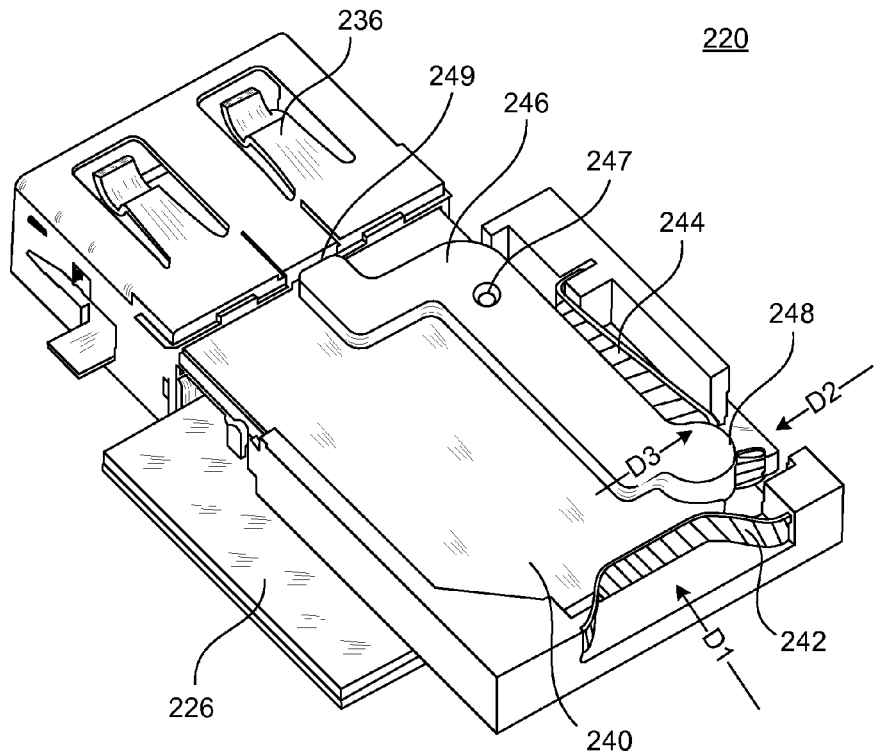
FIG. 6 is a bottom perspective view of the connector receptacle of FIG. 4 with a portion of the housing removed.

FIG. 6 is a bottom perspective cross-sectional view of connector receptacle 220 illustrating an example of the latch, holding, and biasing members of a memory device (e.g., Micro SIM) portion of connector receptacle 220. FIG. 6 shows one example of the ejectable tray 240 being held in the first (latched) position. In the example of FIG. 6, connector receptacle 220 includes a biasing member 242. Biasing member 242 may be biased outward toward the opening of the connector receptacle, as demonstrated by the direction D1 shown in FIG. 6. Thus, biasing member 242 may exert a force in the direction of D1 on the ejectable tray 240 when the ejectable tray 240 is in contact with biasing member 242. In other words, when in the latched position, ejectable tray 240 may be in contact with biasing member 242 and biasing member 242 may push ejectable tray 240 in (or along) the direction of D1. Biasing member 242 may include any mechanism or structure that exerts a force on tray 240, including any of various types of springs (e.g., a flat spring, a coil spring, a compression spring, a cantilever spring, a gas spring, etc.) made of appropriate materials.

Connector receptacle 220 may include a holding member 244 that prevents biasing member 242 from pushing ejectable tray 240 in the direction of D1 when the ejectable tray 240 is in the latched position. For example, the holding member 244 can have a first configuration in which a portion of the holding member 244 contacts and maintains the ejectable tray 240 in the latched position and a second configuration in which the portion of the holding member 244 is no longer (e.g., loses) contact with the ejectable tray 240, allowing biasing member 242 to push ejectable tray 240 in the direction of D1.

Figure 7:
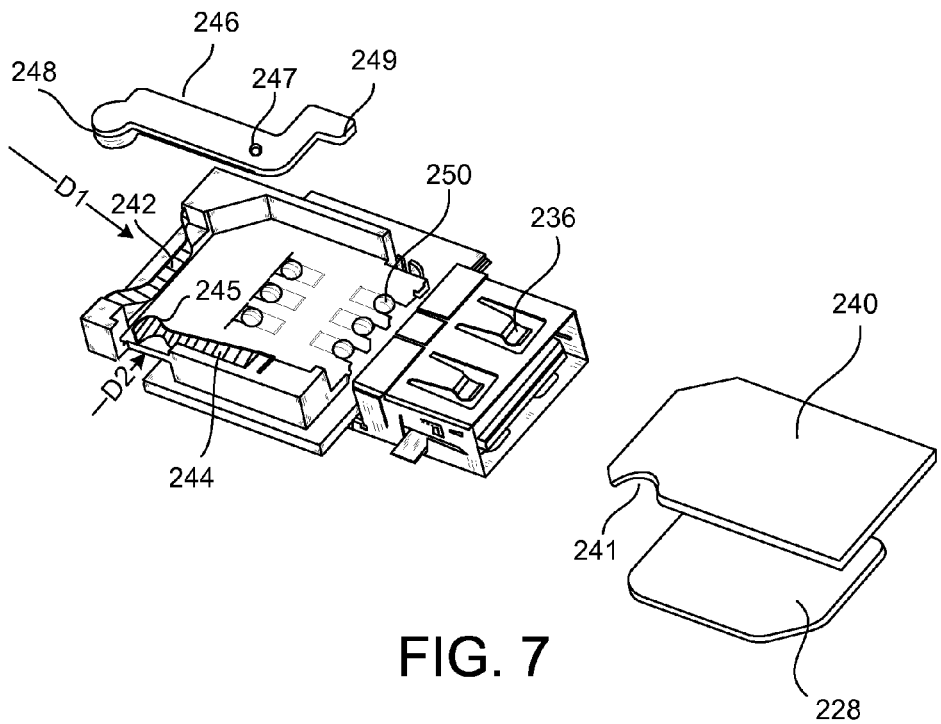
FIG. 7 is a partially exploded view of the bottom perspective view of FIG. 6.

In one implementation, ejectable tray 240 may include a protrusion configured to be received within a recess (e.g., cut-out portion) in the ejectable tray 240. FIG. 7 is a partially exploded bottom perspective view of the connector receptacle of FIG. 4 illustrating an example protrusion of the holding member 244, an ejection member 246, and cut-out portion of ejectable tray 240. In such an implementation the protrusion portion 245 of holding member 244 may be biased in the direction of D2, so that the protrusion 245 is biased to be received within the cut-out portion 241 of tray 240. When the protrusion 245 is within the cut-out portion 241 then holding member 244 is in the first configuration. With the holding member 244 is in the first configuration, biasing member 242 may not move the ejectable tray 240 to the second (unlatched) position. When the protrusion 245 of the holding member 244 is moved out of the cut-out portion 241 of the ejectable tray 240, the biasing member 242 may then push ejectable tray 240 along the direction of D1 from the latched position to the unlatched position.

In some implementations, the protrusion portion of holding member 244 and the cut-out portion of ejectable tray 240 may take forms other than those illustrated in FIGS. 6 and 7. For example, the protrusion portion may be a pin that fits into a hole (i.e., the cut-out portion) in ejectable tray 240 or the protrusion portion may be a lip disposed into a notch (i.e., the cut-out portion) in the tray 240. In some implementations, the protrusion may be configured to prevent biasing member 242 from pushing tray 240 in an outward direction without being disposed in a cut-out portion. For example, the protrusion may be a lip configured to be disposed at an edge of ejectable tray 240 that is opposite the biasing member 242.

In some implementations, a ejection member 246 may be configured to move the protrusion 245 out of the cut-out portion 241 of the ejectable tray 240. In the example of FIGS. 6 and 7, the ejection member 246 is fixedly coupled to the connector receptacle 220 using a pin (not shown) inserted into a pivot point 247 of ejection member 246. Ejection member 246 may pivot around the pin at pivot point 247 when a user applies a force to the ejection member 246 at edge 249. For example, a user may press against ejection member 246 at edge 249 through opening 221, as discussed above with regard to FIG. 4. When the user applies force by, for example, pushing an instrument against ejection member 246 through opening 221, ejection member 246 may rotate around pivot point 247, causing edge 248 to contact the protrusion 245 and to push the protrusion 245 in direction D3, shown in FIG. 6. With enough force (e.g., a specified level of force), the ejection member 246 will cause the protrusion 245 to move out of the cut-out portion 241 of the ejectable tray 240. This will allow biasing member 242 to push the ejectable tray 240 from the latched position to the unlatched position. In some embodiments, the tripping member may take forms other than that illustrated in FIGS. 6 and 7. For example, the tripping member may be a member that lifts a pin out of a hole or a lip out of a notch. In some embodiments the tripping member may be unitarily formed with the holding member. The tripping member may take any form suitable for causing the holding member to move from the first configuration to the second configuration.

Figure 8:
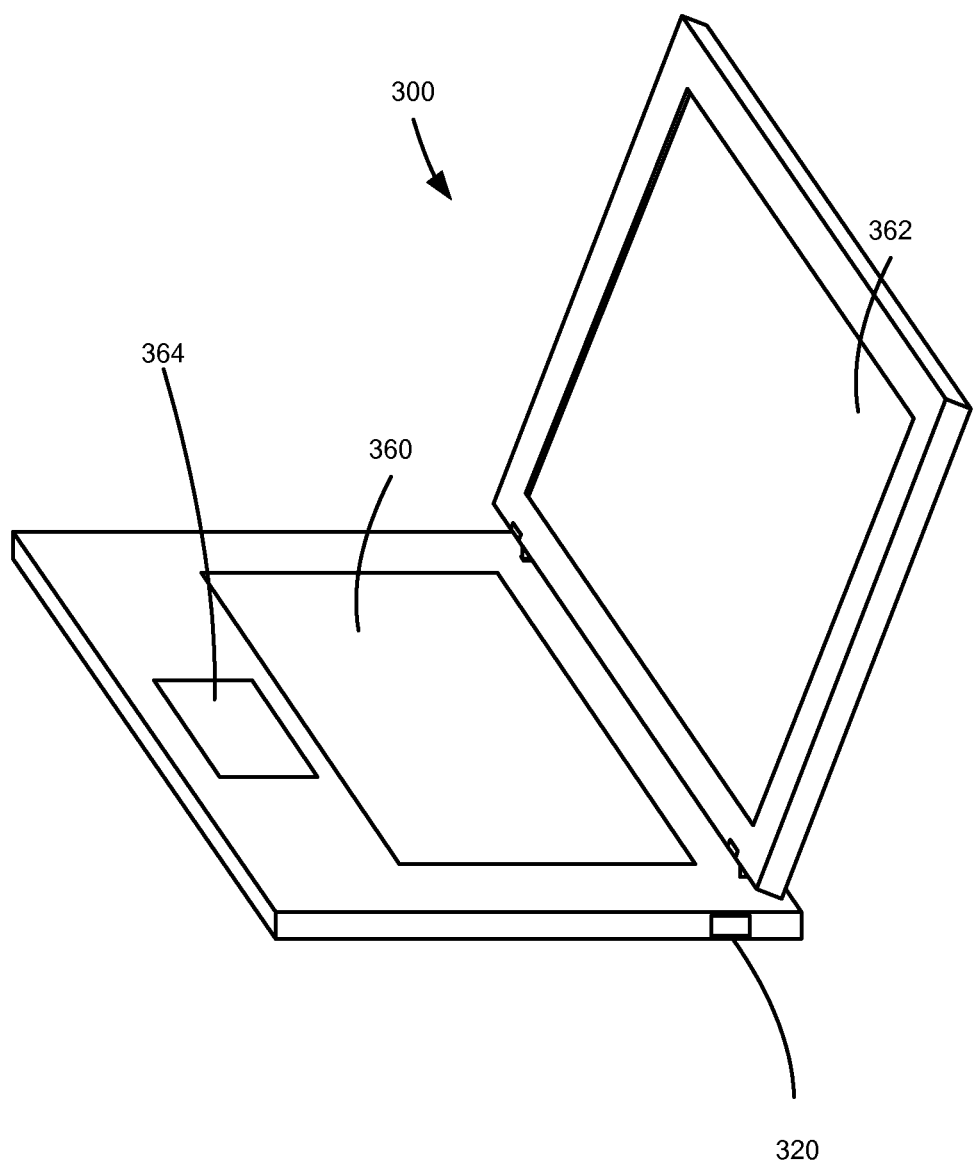
FIG. 8 is an illustration of an example electronic device with an ejectable memory card connector receptacle, according to an implementation.

FIG. 8 is an illustration of an example electronic device with an ejectable memory card connector receptacle, according to an implementation. As shown in FIG. 8, in this implementation, the electronic device is a laptop computer 300 and includes a keyboard portion 360 and display portion 362. The keyboard portion 360 can include a plurality of keys used on typical computing devices (e.g., a QWERTY keyboard layout). The computing device also includes a track pad 364 for controlling the movement of a cursor on display portion 362. The computing device 300 also includes an ejectable memory card connector receptacle 320. Although shown disposed on a right edge of the housing of computing device 300, in some implementations, the connector receptacle 320 may be disposed on any edge of computing device 300.

Although not shown in FIG. 8, the connector receptacle 320 can also include a Micro SIM portion, a USB portion, and electrical circuitry. These components can be the same as or similar to, and function the same as or similar to, the components of the same name described above for connector receptacle 120.

When a Micro SIM card is inserted into the connector receptacle 320 and electrically coupled to the electrical circuitry, the electrical circuitry may enable communications between a processor of the computing device 300 and the Micro SIM card. As a result of such communications, computing device 300 may provide cellular network connectivity to a user of the computing device 300. For example, after a user inserts a Micro SIM card into the connector receptacle 320 by, for example, inserting the Micro SIM card into an ejectable tray and inserting the ejectable tray into the connector receptacle so that the tray is in the latched position, the computing device 300 may access the information stored on the SIM card. The information may contain data used by a cellular network to recognize and authenticate the computing device 300 as a known subscriber of the network.

Figure 9:
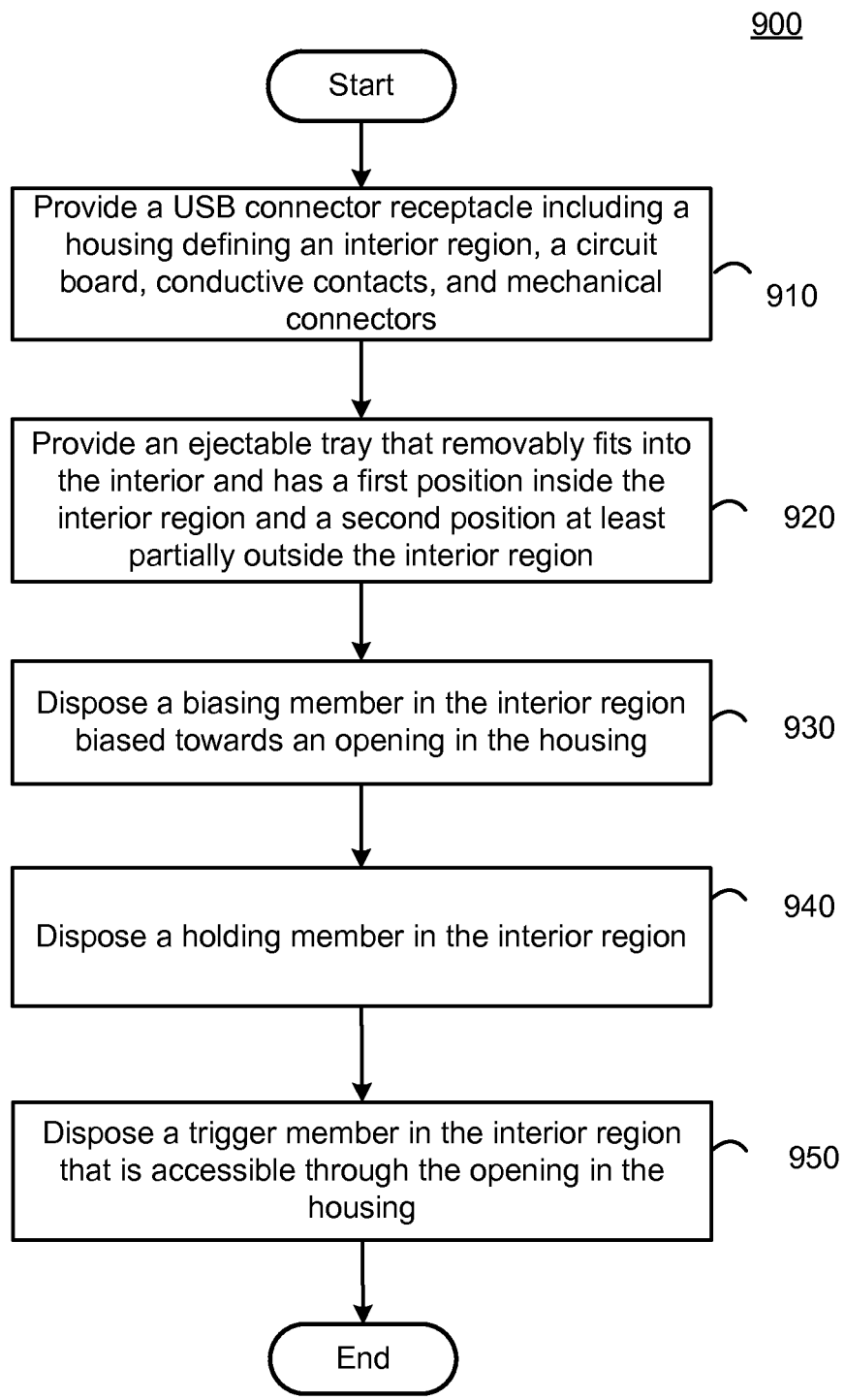
FIG. 9 is a flow chart of a method 900 for making an ejectable memory card connector receptacle, consistent with implementations.

FIG. 9 is a flow chart of a method 900 for making an ejectable memory card connector receptacle, consistent with implementations. At step 910, a connector receptacle is provided. The connector receptacle may include a housing that defines an interior region with an opening, a circuit board, conductive contacts, and mechanical connectors as is known in the art. The circuit board may contain electronic circuitry configured to provide electrical communication between an electronic device and a USB connector and between the electronic device and a memory device, such as a Micro SIM card.

At step 920, an ejectable tray is provided. The ejectable tray may fit removably into the interior region of the connector receptacle. The ejectable tray may include a recessed portion used to maintain the ejectable tray in a first (or latched) position within the interior region of the connector receptacle. The ejectable tray may also have a second (or unlatched) position. In the second position the ejectable tray may be disposed at least partially outside of the interior region of the connector receptacle.

At step 930, a biasing member is disposed in the interior region of the connector receptacle. The biasing member will bias the ejectable tray in the second (or unlatched) position. The biasing member may be a type of spring disposed opposite the opening of the connector receptacle. The biasing member may be fixably coupled to the housing of the USB connector and may be biased in the direction of the opening.

At step 940, a holding member is disposed in the interior region of the connector receptacle. The holding member maintains the ejectable tray in the first position. The holding member may be a type of spring having a first configuration and a second configuration. In the first configuration a portion of the spring contacts and maintains the ejectable tray in the first position. In the second configuration the portion of the spring is moved a spaced (non-zero) distance from the ejectable tray.

At step 950, a trigger member may be disposed in the interior region of the connector receptacle. The trigger member may be accessible through the opening of the connector receptacle so that a user of the electronic device may actuate the trigger member. The trigger member may be operatively coupled to the holding member and configured to move the holding member from the first configuration to the second configuration upon actuation of the trigger member by the user.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. An apparatus, comprising:
a connector receptacle coupled to an electronic device, the connector receptacle configured to receive a universal serial bus (USB) connector from an external device and to receive a memory card;
an ejectable tray disposed within the connector receptacle, the ejectable tray configured to receive the memory card thereon, the ejectable tray configured to be moved between a first position disposed within an interior region of the connector receptacle and a second position disposed at least partially outside the interior region of the connector receptacle and at least partially outside the electronic device; and
a connection member disposed within the connector receptacle and configured to provide electrical communication between the memory card and the electronic device when the memory card has been received by the connector receptacle.

2. The apparatus of claim 1, further comprising:
a first spring and a second spring disposed within the interior region of the connector receptacle, the first spring having a first configuration in which a portion of the first spring contacts and maintains the ejectable tray in the first position and a second configuration in which the portion of the first spring is moved a distance from the ejectable tray, the distance allowing the second spring to bias the ejectable tray at least partially outside of the interior region when the first spring is moved the distance from the ejectable.

3. The apparatus of claim 1,
the ejectable tray being configured to be ejected through an opening in the connector receptacle, the opening used to receive the USB connector.

4. The apparatus of claim 1, further comprising:
a holding member coupled to an interior wall of the connector receptacle, the holding member configured to maintain the ejectable tray in the first position.

5. The apparatus of claim 4, further comprising:
an ejection member disposed within the interior region of the connector receptacle, the ejection member configured to cause the ejectable tray to be moved to the second position upon actuation by a user.

6. The apparatus of claim 1, further comprising:
a spring coupled to an interior wall of the connector receptacle, the spring having a first configuration in which a portion of the spring contacts and maintains the ejectable tray in the first position and a second configuration in which the portion of the spring is moved to a distance from the ejectable tray; and
an ejection member disposed within a portion of the interior region of the connector receptacle and operatively coupled to the spring, the ejection member configured to move the spring from the first configuration to the second configuration upon actuation by a user.

7. The apparatus of claim 1, wherein the connection member is configured to provide electrical communication between the USB connector and the electronic device when the connector receptacle receives the USB connector.

8. An apparatus, comprising:
a universal serial bus (USB) connector receptacle coupled to an electronic device; and
an ejectable tray configured to receive a removable memory device thereon, the ejectable tray configured to be moved between a first position in which the ejectable tray is disposed within an interior region of the USB connector receptacle and a second position in which the ejectable tray is disposed at least partially outside of the interior region of the USB connector receptacle and at least partially outside of the electronic device.

9. The apparatus of claim 8, further comprising:
a holding member disposed within the interior region of the USB connector receptacle, the holding member configured to maintain the ejectable tray in the first position.

10. The apparatus of claim 8, further comprising:
a first spring disposed within a portion of the interior region of the USB connector receptacle, the first spring having a first configuration in which a portion of the first spring contacts and maintains the ejectable tray in the first position and a second configuration in which the portion of the first spring is moved to a spaced distance from the ejectable tray; and
a second spring, the second spring configured to bias the ejectable tray into the second position when the first spring is moved to the second configuration.

11. The apparatus of claim 8, further comprising:
an ejection member disposed within the interior region of the USB connector receptacle, the ejection member configured to cause the ejectable tray to be moved to the second position upon actuation by a user.

12. The apparatus of claim 8, further comprising:
a spring disposed within the interior region of the USB connector receptacle, the spring having a first configuration in which a portion of the spring contacts and maintains the ejectable tray in the first position and a second configuration in which the portion of the spring is moved to a distance from the ejectable tray; and
an ejection member disposed within the interior region of the USB connector receptacle and operatively coupled to the spring member, the ejection member configured to move the spring member from the first configuration to the second configuration upon actuation of the ejection member by a user.

13. The apparatus of claim 8, further comprising:
electrical circuitry configured to provide electrical communication between the removable memory device and the electronic device when the removable memory device is disposed on the ejectable tray and the ejectable tray is in the first position.

14. The apparatus of claim 13, wherein the electrical circuitry is further configured to provide electrical communication between an external device and the electronic device when a USB connector for the external device is operatively coupled to the connector receptacle.

15. A connector receptacle for an electronic device comprising:
an ejectable tray configured to receive a memory device thereon, the ejectable tray being configured to be moved between a first position disposed within an interior region of the connector receptacle and a second position disposed at least partially outside of the interior region of the connector receptacle and at least partially outside of the electronic device such that the memory device can be disposed thereon; and
electrical circuitry disposed within the connector receptacle and configured to:
provide electrical communication between the memory device and the electronic device when the memory device is disposed on the ejectable tray and the ejectable tray is in the first position, and
provide electrical communication between a USB connector and the electronic device when the USB connector is operatively coupled to the connector receptacle.

16. The connector receptacle of claim 15, further comprising:
a holding member disposed within the interior region of the connector receptacle, the holding member having a first configuration in which a portion of the holding member contacts and maintains the ejectable tray in the first position and a second configuration in which the portion of the holding member is moved to a spaced distance from the ejectable tray; and
a biasing member disposed within the interior region of the connector receptacle, the biasing member configured to bias the ejectable tray into the second position when the holding member is moved to the second configuration.

17. The connector receptacle of claim 15, further comprising:
a biasing member disposed within the interior region of the connector receptacle, the biasing member configured to bias the ejectable tray in the second position.

18. The connector receptacle of claim 15, further comprising:
a spring disposed within the interior region of the connector receptacle, the spring configured to maintain the ejectable tray in the first position within the interior region of the connector receptacle.

19. The connector receptacle of claim 15, further comprising:
a first spring disposed within the interior region of the connector receptacle, the spring configured to maintain the ejectable tray in the first position; and
a second spring disposed within the interior region of the connector receptacle, the second spring configured to bias the ejectable tray in the second position.

20. The connector receptacle of claim 15, further comprising:
an ejection member disposed within the interior region of the connector receptacle, the ejection member configured to cause the ejectable tray to be moved to the second position upon actuation of the ejection member by a user.

21. The connector receptacle of claim 15, wherein the memory device is a Micro SIM card and the electrical communication between the Micro SIM card and the electronic device allows the electronic device to provide cellular network connectivity.

* * * * *